No. 765,570. PATENTED JULY 19, 1904.
W. B. FENN.
SHEET GLASS MAKING APPARATUS.
APPLICATION FILED SEPT. 10, 1903.
NO MODEL. 2 SHEETS—SHEET 2.

Witness:
F. W. H. Clay
Oscar Steuernagel

Inventor:
William B. Fenn
By Paul Synnestvedt
Atty.

No. 765,570. Patented July 19, 1904.

UNITED STATES PATENT OFFICE.

WILLIAM B. FENN, OF WASHINGTON, PENNSYLVANIA.

SHEET-GLASS-MAKING APPARATUS.

SPECIFICATION forming part of Letters Patent No. 765,570, dated July 19, 1904.

Application filed September 10, 1903. Serial No. 172,630. (No model.)

*To all whom it may concern:*

Be it known that I, WILLIAM B. FENN, a citizen of the United States, residing at Washington, in the State of Pennsylvania, have invented certain new and useful Sheet-Glass-Making Apparatus, of which the following is a specification.

My invention relates to that branch of the glass-worker's art which has to do particularly with the formation of sheet glass, and one of its primary objects is to do away with the necessity of blowing or using air pressure in the formation of sheet glass and cylinders. Other objects of the invention are, to provide automatic apparatus for simultaneously expanding and elongating a cylinder in order to make uniform sheets; to provide for manipulating the glass into cylindrical form entirely by centrifugal force; to provide means for evenly distributing the glass in the cylinder and for controlling its temperature during the process of forming the cylinder; to provide convenient mechanism for simultaneously rotating and revolving a pivotally suspended mass of glass in order to expand the same into a thin cylinder and elongate it at the same time, and to generally improve the method of working glass into a cylindrical form, whether for vessels or for sheets.

The above objects, together with other advantages which will hereinafter appear, I attain by means of the procedure hereinafter described, and by use of the apparatus which is shown in a simple form for illustration in the accompanying drawings, wherein—

Figure 3 is a partial side elevation and a half section of a convenient form of press mold, showing the plunger therein and the glass being attached to the screw carrier ring for use in my apparatus, and Figure 4 is a partial side elevation of the mold in Figure 3, taken at right angles to the latter view.

According to the most widely used method of forming sheet glass at the present time, the workman gathers a bulb of glass upon the end of a hollow pipe and blows it full of air in order to distend it and to prevent its collapsing in the subsequent movements, when he alternately gives it a whirling movement which by the aid of the compressed air inside, expands the hollow bulb of glass, and then gives it a swinging movement by which the centrifugal force of the weight of the glass elongates the globe into a cylinder. These two movements are performed in alternation, the cylinder being occasionally reheated, and the work is usually done by hand; the air inside of the globe being continually augmented by blowing at intervals until a cylinder is formed which is approximately of the required thickness on the side, when the ends of the cylinder being cut off, it is split and rolled out flat and cut into sheets after being annealed. This is a manual process, requires both hands, and the lungs for blowing, and among its limitations and defects are, the difficulty of simultaneously elongating the cylinder and spreading it to make it thinner, the necessity of intermittently blowing air thereinto, the need of assistants, and the impossibility of using mechanical means in any practical manner, and the uncertainty of the process, which depends from beginning to end entirely upon the individual skill of the workman on each mass of glass being operated upon. Another difficulty is that the temperature of the glass rapidly falling, it soon becomes too hard to work and it is necessary that the operation be done in great hurry, since the cooling of the glass cannot be effectually delayed with any good results.

I overcome a great many of the present difficulties by providing a means for pivotally suspending a partially hollow mass of glass and rotating it rapidly about its axis, while at the same time revolving it in a circle on the end of a supporting arm, so that by the centrifugal force of the swinging or revolving movement, supplementing the weight of the glass hanging down from the holder, (these two forces being combined by reason of the pivoted mounting allowing of an inclination from the vertical), centrifugal force is used both to laterally expand the cylinder and to elongate it downward from the holder, the lateral force being employed also to retard elongation, in order to control the thickness.

Figure 1:
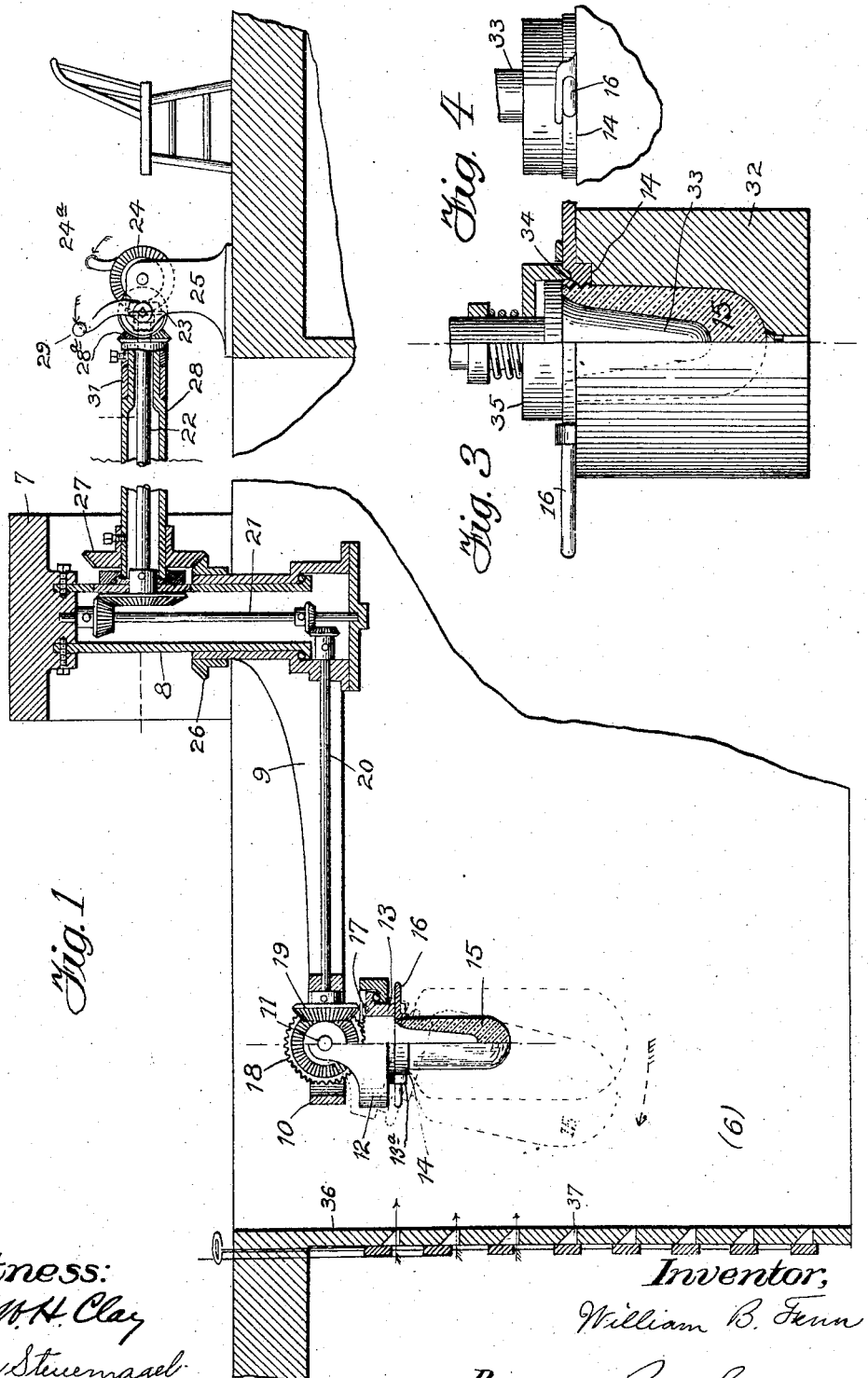
Figure 1 is a broken view, showing a vertical central section through some of the apparatus and through a heating pit which may when desired, be used in connection with the same.
Figure 2:
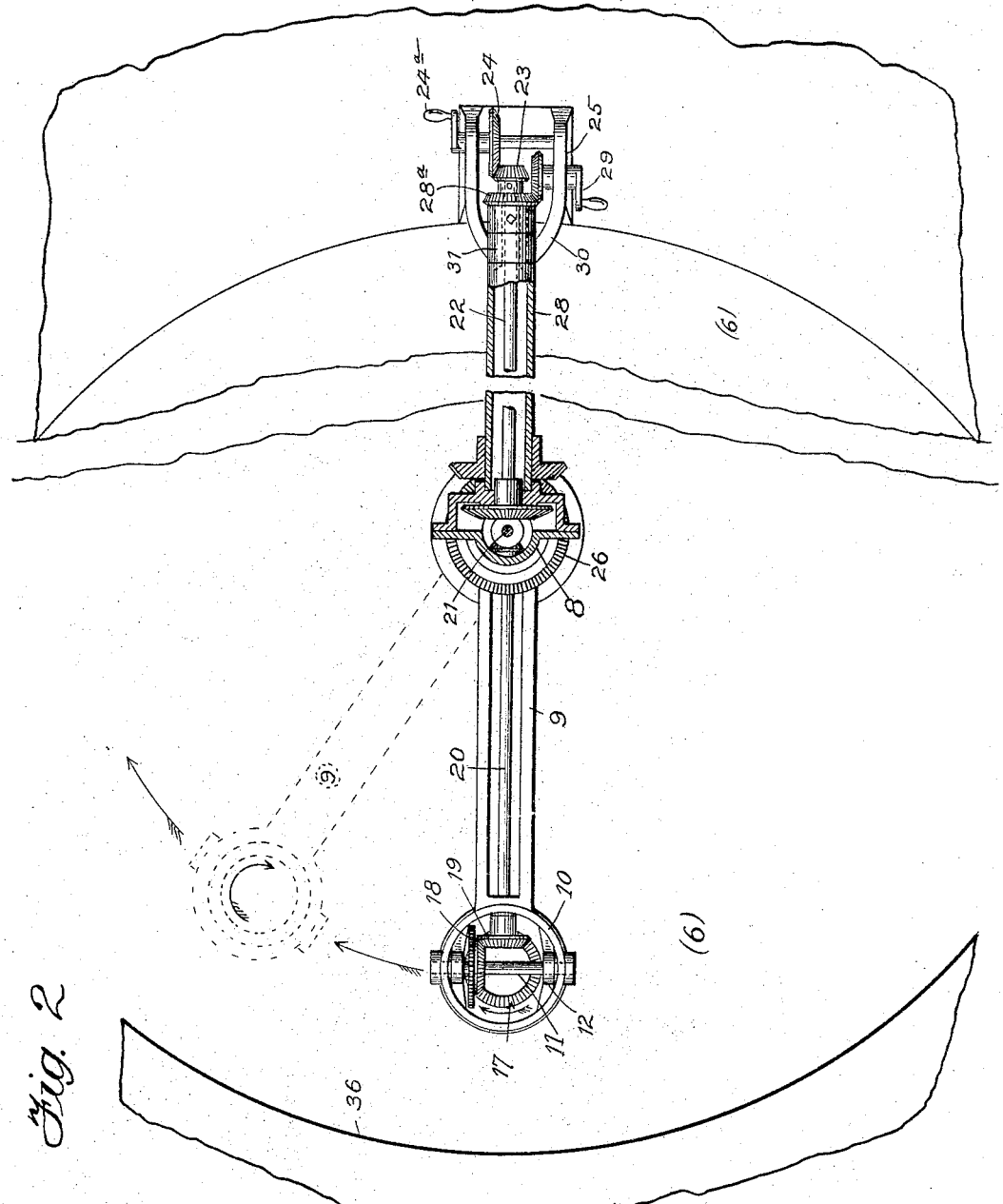
Figure 2 is a broken plan view of the apparatus, showing a horizontal section through parts of the actuating mechanism for revolving the arm, and indicating the outlines of the pit.

My invention is not confined to any particular mechanism for effecting these motions, but in the illustration herein, from Figure 1 it will be seen that I first provide a pit (6) which is intended to have perforated walls and means for controlling the heat of the pit by injecting flame or hot or cold air at any desired point through the circumferential walls of the same. The inlets for this purpose may be a series of holes or pipe nozzles, each governed by a damper and handle, as indicated in Figure 1. Depending from any suitable support 7, is a hollow post 8, upon which is revolubly mounted the arm 9, which at its outer end carries a head 10, within which is journaled a shaft 11, carrying pivotally suspended thereon the yoke ring 12. This is provided with a bearing seat, and inside of it is carried a rotatable ring 13, which has attached to it a screw carrier ring 14, in which the glass 15, is carried in any convenient manner. The ring 13 has upon its top a crown gear 17, which is engaged by a gear 18, fixed upon the shaft 11, and is driven to rotate rapidly by means of the miter gear 19, fixed upon the shaft 20, which in its turn is driven by the shaft 21, and the shaft 22, conveniently arranged with a miter gear at its end, engaging another gear 24, which is moved by means of the handle 24$^a$. The end of the shaft 22 and the various gears, may be conveniently supported in a frame 25.

At the same time with the axial rotation of the supporting ring 13, in its place, suspended in yoke 12 in the head 10, the supporting arm 9 is itself swung or revolved about the central post 8 by means of a miter gear 26, which engages the gear 27, carried upon the revolving sleeve 28, and moved by means of the gears 28$^a$, and the handle 29, as will be clear from the drawing. This revolving sleeve may be conveniently supported by the arms 30, from the frame 25, carrying the stationary collar 31. Thus both the rotary motion of the carrier ring and the revolving motion of the carrier arm may be effected simultaneously from one point by one workman seated in a position convenient to watch the whole work. Means may be conveniently provided by which at the same time the workman can with his feet operate the valves shown on the left of Figure 1 for opening and closing the inlets 37, in the wall 36 of the pit, in order to admit flame or hot or cold air at the desired points and the proper time, as the work proceeds.

Though such special devices are not material to my invention, I have illustrated in Figures 3 and 4 a means for attaching the mass of glass and for giving it the initial hollow form. The mold 32 may be constructed as ordinarily; a charge of glass 15 being placed therein, the screw ring 14 is placed on top of the mold, when the plunger 33 descends therein and forms the glass into a crude hollow shape and at the same time presses the glass into the threads 34, on the screw ring 14, which may thus conveniently retain the same in the ring. This ring 14 is provided with handles 16, which engage hooks 13$^a$, on the rotary ring 13, in order to hold the same in place during the operations above described.

From the above description of the apparatus it will be clear that the operation is as follows: The hollow mass of glass 15, being supported by the ring 14 in place, as shown in Figure 1, the movement of the crank 24$^a$ will impart a rapid axial rotation to the ring 13, carrying the mass of glass 15 with it, which will evidently have the effect of laterally distending the same into a cylinder. At the same time the revolving movement of the arm 9 by crank 29 will tend to swing the cylinder of glass 15 outward with respect to its pivotal support 11, as indicated in dotted lines, and the combined effect of the weight of the glass acting vertically, and the centrifugal force operating horizontally, will cause the cylinder of glass to take an inclined position, so that the resultant of the two said forces acting along the axial line thereof will elongate the cylinder at the same time that its rotation or whirling movement is distending it laterally. It will be seen that if the charge is a homogeneous mass the combination of these two motions will necessarily result in making a cylinder of uniform circumferential thickness. It may be controlled entirely by one workman operating the cranks as described, and it will be observed that by injecting flame or hot or cold air into the pit through the side walls 36 at any desired point and with any desired intensity, the glass may be kept at whatever temperature is desired in order to prolong the operation or to heat or cool one portion of the cylinder more than another portion, as may be desired. It is to be observed that in the formation of the cylinder the mass of glass is subjected to centrifugal forces governed by three movements, namely, the revolving movement, the axial rotation, and the swinging movement on its pivot, and that by reason of these three movements it is entirely under control and takes a uniform thickness on any circumferential line. At the same time all sides of the cylinder are subjected alike to the incoming flame or cold air admitted through the wall 36. In this procedure the centrifugal force of the axial rotation of the mass of glass 15 will serve to keep the center part of it open. In cases where it may be desirable to introduce air pressure in addition to centrifugal force, this may evidently be done by providing an air pipe carried on the arm 9. It will be understood, of course, that in handling extremely large cylinders of glass, engine motive power will be introduced to move the various parts; and in general, I wish it to be understood that I am not confined either to the form of apparatus shown for illustration, nor to the use of the same in connection with the heating pit as shown, but the invention consists in its broader aspect in the provision of mechanism for simultaneously rotating and revolving a pivotally suspended hollow mass of glass for the purpose of both distending and elongating the cylinder by centrifugal forces.

Having thus described my invention and illustrated its use, what I claim as new, and desire to secure by Letters Patent, is the following:

1. The combination of a holder adapted to pivotally suspend a hollow mass of glass free to the influence of gravity, means for axially rotating said holder, and a support for the holder and means to continuously revolve it simultaneously with the rotation, in a horizontal plane, whereby continuously acting centrifugal and gravity forces both distend and elongate the said mass of glass.

2. A glass handling apparatus comprising a holder adapted to pivotally suspend a hollow mass of glass, means for rotating the holder axis about the center of suspension, and means for supporting and continuously revolving the holder in a horizontal plane about an outside center, the axis of suspension and of revolution being thus pivotally connected, whereby gravity may adjust the angular position of the glass while centrifugal force may elongate without distorting the mass, substantially as described.

3. In glass working apparatus the combination of an axially rotatable holder ring pivotally mounted to swing freely, means for rotating said pivoted holder ring and a supporting arm and means for revolving the holder in a horizontal plane about an outside center.

4. The combination of a pivoted arm and means for revolving it, a yoke ring pivotally mounted in the end of said arm and provided with a movable holder ring and means for rotating it while the arm is revolving, substantially as described.

5. The combination of a holder ring and mechanism for uniformly rotating it, means for suspending the said holder ring for lateral swinging movement, and mechanism for uniformly revolving or swinging the said holder ring horizontally about an outside center.

6. The combination of a holder for a hollow mass of glass, the same being pivotally mounted with respect to its support to swing in a vertical plane, means for revolving the holder in a horizontal plane, and means for simultaneously giving the holder an axial rotation in place, whereby the holder and mass of glass may adjust itself to the combined influence of gravity and the centrifugal force.

7. A pivotally mounted holder, mechanism to continuously revolve said holder horizontally about an outside center, and mechanism to axially rotate said holder in a plane perpendicular to the resultant line of force determined by the combined gravity and centrifugal forces, substantially as described.

8. An arm mounted to revolve in a horizontal plane, a holder on the end of said arm pivotally suspended therefrom to swing in a vertical plane, and means to rotate the pivoting axis of the holder about the line of suspension.

9. The combination with mechanism for axially rotating a mass of glass and for revolving it about an outside center, of a heating pit having means for injecting flame or hot or cold air upon the revolving and rotating mass of glass, substantially as described.

In testimony whereof I have hereunder signed my name in the presence of the two subscribed witnesses.

WILLIAM B. FENN.

Witnesses:
B. F. ROBERT,
C. N. EDMONDS.